United States Patent [19]

Ohsugi et al.

[11] Patent Number: 4,888,406
[45] Date of Patent: Dec. 19, 1989

[54] POLYMERIZABLE MONOMER CONTAINING SILICONS AND PREPARATION THEREOF

[75] Inventors: Hiroharu Ohsugi; Yoshio Eguchi, both of Osaka; Satoshi Urano; Ryuzo Mizuguchi, both of Kyoto; Mitsuhiro Takarada, Gunma, all of Japan

[73] Assignee: Nippon Paint Co., Ltd., Osaka, Japan

[21] Appl. No.: 135,302

[22] Filed: Dec. 21, 1987

[51] Int. Cl.[4] ............................................. C08G 77/20
[52] U.S. Cl. .................................... 528/32; 526/279; 556/418; 556/419; 556/421
[58] Field of Search ................. 556/418, 419, 421; 526/279; 528/32

[56] References Cited

U.S. PATENT DOCUMENTS 4,307,240  12/1981  Ching ............................... 556/416
4,633,003  12/1986  Falcetta et al. ................. 556/419

Primary Examiner—Melvyn I. Marquis
Attorney, Agent, or Firm—Wenderoth, Lind & Ponack

[57] ABSTRACT

A novel class of polymerizable monomers containing silicons represented by the formula:

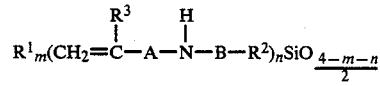

wherein $R^1$ represents a substituted or unsubstituted monovalent hydrocarbon residue; $R^2$ represents an alkylene attached to silicon atom and selected from an unsubstituted alkylene, a substituted alkylene, an unsubstituted alkylene containing hetero atoms or a substituted alkylene containing hetero atoms; m and n each represents a positive number which will fulfil the requirement of $2 \leq m+n \leq 4$; $R^3$ is hydrogen or methyl; A is a direct bond,

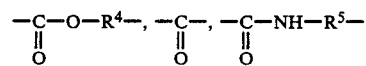

or a substituted or unsubstituted phenylene; B is

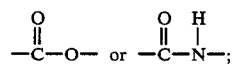

$R^4$ and $R^5$ each represents an alkylene, providing that when A represents

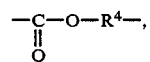

$m+n$ is 2. The invention also provides a preparation method thereof.

25 Claims, No Drawings

POLYMERIZABLE MONOMER CONTAINING SILICONS AND PREPARATION THEREOF

FIELD OF THE INVENTION

The present invention relates to a novel class of polymerizable monomers containing silicons and to the preparation thereof.

BACKGROUND OF THE INVENTION

As a measure for giving the characteristics possessed by a siloxane resin as water resistance, weather resistance and the like to an acrylic resin or other resins, attempts have been made to fix an organosiloxane, through a chemical linkage, to a compound bearing radically polymerizable unsaturation bond. For example, Japanese Patent Application Kokai No. 61126/79 discloses methyl di (trimethyl siloxy) silyl propyl glycerol methacrylate which is prepared by the addition reaction of an organopolysiloxane containing epoxy groups and methacrylic acid and is used as a monomer for a resin which is excellent in oxygen permeability and hydrophilic properties and hence is useful as a contact lens material; Japanese Patent Application Kokai No. 63200/79 discloses an organopolysiloxane containing acryloyloxy groups which has the characteristic of being cured in a short period of time under irradiation condition and which is prepared by the reaction of an organopolysiloxane containing amino groups and glycidyl acrylate; Japanese Patent Application Kokai No. 22325/81 discloses a process for the preparation of polymerizable organopolysiloxane by the reaction of organopolysiloxane containing epoxy groups and acrylate; and Japanese Patent Application Kokai No. 180667/82 discloses a process for the preparation of polymerizable organosiloxane by the reaction of trialkyl chlorosilane and hydroxyalkyl acrylate.

However, in the heretofore proposed processes for the preparation of silicon modified monomers, the reaction speed and yield were not always of satisfaction and since the introduction of hydrophobic siloxane bonds to polymerizable monomers was the only object of such methods, the actual use of resulted monomers had been rather limited as a matter of course.

It is, therefore, an object of this invention to provide a novel class of polymerizable monomers containing silicons which will bear, besides siloxane bonds, additional functional groups or bondings and are employable in a wider range of applications, and which can be prepared advantageously with a higher degree of reaction speed and reaction yield.

An additional object of the invention is to provide such industrially advantageous method for the preparation of the present novel monomers.

SUMMARY OF THE INVENTION

According to the invention, the aforesaid objects can be attained with a novel class of polymerizable monomers containing silicons of the formula (I):

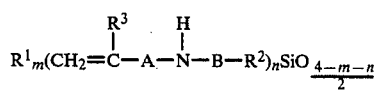  (I)

wherein $R^1$ represents a substituted or unsubstituted monovalent hydrocarbon residue; $R^2$ an alkylene attached to silicon atom and selected from an unsubstituted alkylene, a substituted alkylene, an unsubstituted alkylene containing hetero atoms or a substituted alkylene containing hetero atoms; m and n each represents a positive number which will fulfil the requirement of $2 \leq m+n \leq 4$; $R^3$ is hydrogen or methyl; A is a direct bond,

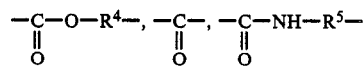

or a substituted or unsubstituted phenylene; B is

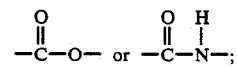

$R^4$ and $R^5$ each represents an alkylene, providing that when A represents

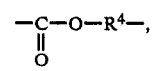

m+n is 2.

PREFERRED EMBODIMENTS OF THE INVENTION

The present polymerizable monomers containing silicons are characterized, and are clearly distinguishable from the heretofore proposed silicon modified monomers, in that hydrophilic urethane bondings are included, besides hydrophobic siloxane bondings, in the molecule. Thus, the hydrophilic and hydrophobic natures are well balanced in the present polymerizable monomers and therefore, they are quite useful as starting monomers in various resins as, for example, industrial resins, coating resins and the like. Furthermore, since a urethane bond can be easily obtained in a higher yield by the reaction of an isocyanate group and an active hydrogen bearing group as hydroxyl, actual production of the present polymerizable monomers is quite easy to do.

That is, the present polymerizable monomers containing silicon can be industrially and advantageously prepared by the reaction of an organosilicon compound of the formula (II):

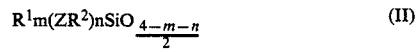  (II)

wherein Z is HO— or NH$_2$— $R^1$ represents a substituted or unsubstituted monovalent hydrocarbon residue; $R^2$ is an alkylene attached to silicon atom and selected from an unsubstituted alkylene, a substituted alkylene, an unsubstituted alkylene containing hetero atoms or a substituted alkylene containing hetero atoms; m and n each is a positive number which will fulfill the requirement of $2 \leq m+n \leq 4$, providing that when A of the undermentioned isocyanate compound represents

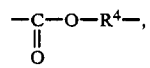

m+n is 2, with an isocyanate compound having a α,β-ethylenically unsaturated bond represented by the formula (III):

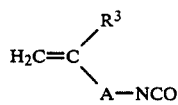

wherein $R^3$ is hydrogen or methyl; A is a direct bond,

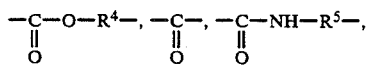

or a substituted or unsubstituted phenylene; $R^4$ and $R^5$ each represents an alkylene.

As the organosilicon compounds containing hydroxyl groups of the formula (II), any of linear or cyclic siloxanes or silanes having one and more silicon atoms may be satisfactorily used, providing having at least one hydroxy alkyl group attached to silicon atoms. Preferable members are the compounds of the formula (II) in which $R^1$ represents substituted or unsubstituted $C_1$ to $C_6$ alkyl or alkenyl group and $R^2$ represents substituted or unsubstituted lower alkylene or hetero atom containing lower alkylene group. More specifically, particularly preferable members are 1,3,5,7-tetramethyl-3,5,7-tripropyl-1-(γ-hydroxypropyl) cyclotetrasiloxane, bis (trimethylsiloxy) methyl-3-hydroxy propyl silane, 1,3,5,7-tetramethyl-3,7-dipropyl-1,5-bis (γ-hydroxypropyl) cyclotetrasiloxane, 1,1,3,3-tetramethyl-1,3-bis (γ-hydroxypropyl) disiloxane, 1,1,3,3,3-pentamethyl-1-(γ-hydroxypropyl) disiloxane, tris (trimethylsiloxy)-γ-hydroxy propyl silane, 1,3,5,7-tetramethyl-3,5,7-tripropyl-1-γ-(β-hydroxyethoxy) propylcyclotetrasiloxane, bis (3-aminopropyl) tetramethyl siloxane, α,ω-bis (3-aminopropyl) dimethyl polysiloxane, 1,3,5,7-tetramethyl-3,5,7-tripropyl-1-(γ-(β-hydroxyethoxy)propyl) cyclotetrasiloxane, 1,3,5,7-tetramethyl-3,7-diphenyl-1,5-bis (γ-(β-hydroxy ethoxy)propyl) cyclotetrasiloxane, 1,1,3,3-tetramethyl-1,3-bis (γ-(β-hydroxyethoxy)propyl) disiloxane hydroxymethyl trimethyl silane, hydroxymethyl diphenyl methyl silane, hydroxymethyl dimethyl phenyl silane, hydroxypropyl dimethyl phenyl silane, hydroxymethyl dimethyl ethyl silane, hydroxymethyl diethyl methyl silane, hydroxymethyl triethyl silane, 3-aminopropyl dimethyl phenyl silane, 3-aminopropyl diphenyl methyl silane, γ-(hydroxyethoxy) propyl diphenyl methyl silane, γ-(hydroxyethoxy) propyl trimethyl silane, γ-(hydroxyethoxy) propyl dimethyl phenyl silane, and the like.

Examples of isocyanate compounds having α,β-ethylenically unsaturated bonds represented by the formula (III) are methacryloyl isocyanate, 2-isocyanate ethyl methacrylate, 2-isocyanate methyl methacrylate, 2-isocyanate ethyl acrylate, 2-isocyanate propyl methacrylate, 2-isocyanate octyl acrylate, p-isopropenyl-α,α-dimethyl benzyl isocyanate, m-isopropenyl-α,α-dimethyl benzyl isocyanate, p-ethylenyl-α,α-dimethyl benzyl isocyanate, m-ethylenyl-α,α-dimethyl benzyl isocyanate, vinyl isocyanate and the like. Particularly preferable member from the standview of higher reactivity toward active hydrogen bearing group is methacryloyl isocyanate.

The aforesaid compound (II) and compound (III) are generally reacted in an equimolar ratio of hydroxyl group in said compound (II): isocyanate group in said compound (III). When a highly reactive isocyanate compound is selected, the urethane reaction can be proceeded very quickly without using a catalyst and at a room temperature, and however, when a less reactive isocyanate compound is used, an appropriate catalyst as dibutyl tin dilaurate is usually used and the reaction may be advantageously carried out at an elevated temperature, e.g. 70°–110° C., for 2–4 hours. In either case, the reaction yield is excellent.

The present polymerizable monomers containing silicons may also be prepared by the combination of steps of reacting an organosilicon compound of the formula (II):

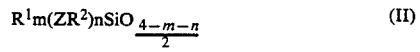

wherein Z is HO— or $NH_2$— $R^1$ is a substituted or unsubstited monovalent hydrocarbon residue; $R^2$ is an alkylene attached to silicon atom and selected from an unsubstituted alkylene, a substituted alkylene, an unsubstituted alkylene containing hetero atoms, or a substituted alkylene containing hetero atoms; m and n each represents a positive number which will fulfill the requirement of $2 \leq m+n \leq 4$, providing that when A of the undermentioned isocyanate compound represents

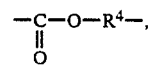

m+n is 2, with an isocyanate compound containing haloethyl group of the formula (IV):

wherein Y represents a halogen atom; $R^3$ is hydrogen or methyl; A is a direct bond,

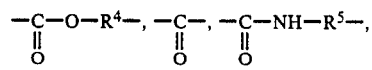

or a substituted or unsubstituted phenylene; $R^4$ and $R^5$ each represents an alkylene, to obtain a compound of the formula (V):

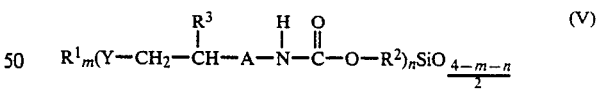

in which $R^1$, $R^2$, $R^3$, m, n, Y and A are as defined above, and of reacting the abovementioned compound (V) with a dehydrohalogenation agent.

In this method, the same organo silicon compounds containing hydroxyl groups (II) as used in the aforesaid first preparation method are advantageously used. However, differing from the first method, the said compound (II) is reacted with an isocyanate compound containing haloethyl group of the formula (IV):

wherein Y, $R^3$ and A are as defined above. Examples of isocyanate compounds of the formula (IV) are α- chloromethyl propionyl isocyanate, β-chloropropionyl isocyanate, and the like.

By this reaction, a compound of the formula (V)

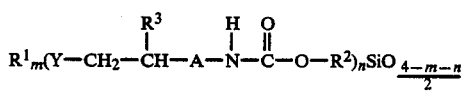

wherein $R^1$, $R^2$, $R^3$, m, n, Y and A are as defined above, can be easily obtained in a higher yield.

Next, a dehydrohalogenation agent, e.g. sodium hydroxide, potassium hydroxide, sodium alcoxide potassium alcoxide, alkali carbonate, pyridine, dialkyl amines, trialkyl amines as triethyl amine and the like, is added and reacted to obtain the objective compound represented by the formula (I).

Since the both reactions of Step 1 and Step 2 are proceeded very effectively and quickly, this alternative method is also quite useful for the production of the present polymerizable monomers containing silicons.

The present polymerizable monomers are most conveniently expressed by means of the aforesaid rational formula (I). Among them, particularly useful members shall be given hereinunder, using the structural formula, respectively.

Cyclic siloxane monomers

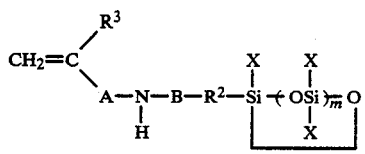

wherein X is

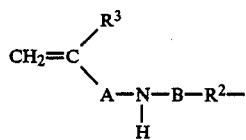

or monovalent hydrocarbon residue; $R^2$, $R^3$, A and B are as defined hereinbefore; m is an integer of 2 and more.

Linear (non-cyclic) siloxane monomers

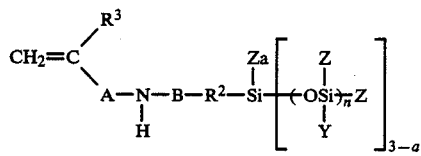

wherein $R^2$, $R^3$, A and B are as defined above; Y represents

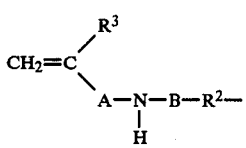

or a monovalent hydrocarbon residue; Z is a monovalent hydrocarbon residue; a is 1 or 2 and n is an integer of 1 and more.

Monomers containing silicon

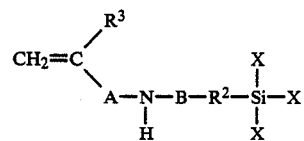

wherein $R^2$, $R^3$, A and B are as defined above, and X is a monovalent hydrocarbon residue or

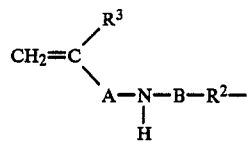

The present polymerizable monomers containing silicons are characterized by having, in its molecule, urethane functionalities, as well as silicon-carbon bondings and siloxane bondings, and are specifically useful as starting monomers for various industrial and coating resins. The invention shall be now more fully explained in the following examples. Unless otherwise being stated, all parts and percentages are by weight.

EXAMPLE 1

Into a 4-necked flask fitted with a stirrer, a reflux condenser and a dropping funnel, were placed 424 parts of 1,3,5,7-tetramethyl-3,5,7-tripropyl-1-(γ-hydroxypropyl) cyclotetrasiloxane and 60 parts of butyl acetate and the mixture was maintained at 20°–25° C.

To this, were dropwise added 111 parts of methacryloyl isocyanate at a constant speed in 30 minutes and after completion of said addition, the mixture was maintained at a room temperature for 3 hours and then stirred at 50° C. under 5 mmHg pressure for 1 hour to remove butyl acetate out of the system. Thus obtained product was confirmed to be of the structure A:

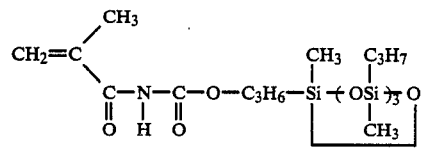

from infra-red absorption spectrum analysis and mass spectrum analysis thereof, and was a slightly viscous, clear liquid; the purity determined by quantitative analysis by gas chromatography means 98.8%; refractive index $n_D^{25} = 1.454$; and the viscosity 180 cp.

EXAMPLE 2

Into a similar reaction vessel as used in Example 1, were placed 280 parts of bis(trimethylsiloxy)-methyl-3-hydroxypropyl silane and maintained at 20°–25° C.

To this, were dropwise added 111 parts of methacryloyl isocyanate in 30 minutes at a constant speed under oxygen stream and the mixture was then maintained at 20°–25° C. for 1 hour to obtain the reaction product, which was confirmed by infra-red spectrum analysis to be of the formula (B):

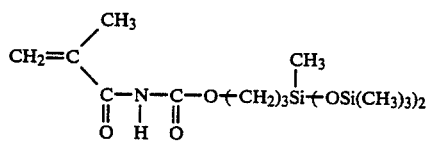

The product was a slightly visous, clear liquid; the purity confirmed by gas chromatography 98.5%; and the viscosity 450 cp.

EXAMPLE 3

Into a similar reaction vessel as used in Example 1, were placed 424 parts of 1,3,5,7-tetramethyl-3,5,7-tripropyl-1-(γ-hydroxypropyl) cyclotetrasiloxane, 0.5 part of dibutyl tin dilaurate and 100 parts of xylene and the mixture was maintained at 80°–85° C.

To this, was dropwise added under oxygen stream and at a constant speed a mixture of 155 parts of methacrylic acid 2-isocyanate ethyl and 0.06 part of 2,6-dimethyl-4-methyl phenol in 30 minutes and the mixture was maintained at a room temperature for 1 hour and then stirred at 50° C. under 5 mmHG pressure for 1 hour to remove xylene off.

Thus obtained product was confirmed by infra-red spectrum analysis to be of the following formula (C):

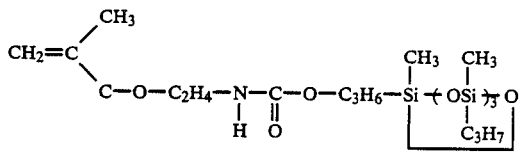

and was a slightly viscous, clear liquid; the purity confirmed by gas chromatography 99.1%; the refractive index $n_D^{25}=1.4424$; and the viscosity 200 cp.

EXAMPLES 4–9

Into a similar reaction vessel as used in Example 1, was placed 1 chloroform solution of the silicon compound of the following Table 1 and then methacryloyl isocyanate was dropwise added at a room temperature.

After completion of said addition, the mixture was stirred at a room temperature for 2 hours and chloroform was removed under reduced pressure to obtain an oily product of polymerizable monomer shown in the following Table 1. Viscosity (measured by using EL type viscometer manufactured by Tokyo Keiki) and number average molecular weight (Mn) of the product are also shown in Table 1.

TABLE 1

| Example | silicon compound | polymerizable silicon compound | viscosity (cp) | Mn |
|---|---|---|---|---|
| 4 | CH₃—Si(CH₃)(CH₃)—CH₂—OH | CH₃—Si(CH₃)(CH₃)—CH₂OCNHCC=CH₂ (with CH₃) | 100 | 215 |
| 5 | CH₂CH₂(Si(CH₃)—O)ₙSi(CH₃)—CH₂CH₂ with CH₂OH ends, Mn = 1000 | corresponding methacryloyl-urethane derivative | 100 | 1200 |
| 6 | CH₂CH₂(Si(CH₃)—O)ₙSi(CH₃)—CH₂CH₂ with CH₂OH ends, Mn = 3200 | corresponding methacryloyl-urethane derivative | 140 | 3400 |

TABLE 1-continued

| Example | silicon compound | polymerizable silicon compound | viscosity (cp) | Mn |
|---|---|---|---|---|
| 7 | CH₂CH₂(-Si(CH₃)(CH₃)-O-)ₙSi(CH₃)(CH₃)-CH₂CH₂ with CH₂OH end groups; Mn = 5600 | CH₂CH₂(-Si(CH₃)(CH₃)-O-)ₙSi(CH₃)(CH₃)-CH₂CH₂ with -CH₂-O-C(=O)-NH-C(=O)-C(CH₃)=CH₂ end groups | 240 | 5800 |
| 8 | CH₂CH₂(-Si(CH₃)(CH₃)-O-)ₙSi(CH₃)(CH₃)-CH₂CH₂ with CH₂NH₂ end groups; Mn = 1680 | CH₂CH₂(-Si(CH₃)(CH₃)-O-)ₙSi(CH₃)(CH₃)-CH₂CH₂ with -CH₂-NH-C(=O)-NH-C(=O)-C(CH₃)=CH₂ end groups | 520 | 1900 |
| 9 | CH₂CH₂(-Si(CH₃)(CH₃)-O-)ₙSi(CH₃)(CH₃)-CH₂CH₂ with CH₂NH₂ end groups; Mn = 3800 | CH₂CH₂(-Si(CH₃)(CH₃)-O-)ₙSi(CH₃)(CH₃)-CH₂CH₂ with -CH₂-NH-C(=O)-NH-C(=O)-C(CH₃)=CH₂ end groups | 330 | 4100 |

EXAMPLE 10

To a solution of 1.04 g (0.01 mol) of hydroxymethyl trimethyl silane in 80 ml of chloroform, were dropwise added 1.47 g (0.01 mol) of α-chloromethyl propionyl isocyanate at a room temperature. After stirring for 1 hour, 1.01 g (0.01 mol) of triethyl amine were dropwise added and the combined mixture was stirred for 2 hours. The formed triethylamine hydrochloride was filtered and the filtrate was subjected to vacuum distillation to remove chloroform, thereby obtaining 3.45 g of a colorless oil of N-methacryloyl carbamic acid trimethyl silyl methyl ester. Viscosity of said oily product was 100 cp.

EXAMPLE 11

To a solution of 1.04 g (0.01 mol) of hydroxymethyl trimethyl silane in 81 ml of chloroform, were dropwise added 1.33 g (0.01 mol) of β-chloropropionyl isocyanate at a room temperature and after stirring for 1 hour, 1.01 g (0.01 mol) of triethylamine were added thereto. After stirring for 2 hours, the formed triethylamine hydrochloride was filtered and the filtrate was vacuum distilled to remove chloroform. Thus, 3.32 g of N-acryloyl carbamic acid trimethyl silyl methyl ester were obtained as a colorless oily product, whose viscosity was 90 cp.

EXAMPLES 12-13

The same procedures as stated in Example 11 were repeated with the materials shown in Table 2 and polymerizable monomers containing silicons were obtained as shown in Table 2.

TABLE 2

| Example | silicon compound | polymerizable silicon compound | viscosity (cp) |
|---|---|---|---|
| 12 | $C_3H_7-Si(CH_3)(O-Si(CH_3)C_3H_7)-O-Si(CH_3)(C_3H_7)$ structure with $-CH_2CH_2CH_2OH$ | same structure with $-CH_2CH_2CH_2OCNH-C(=O)-CH=CH_2$ | 160 |
| 13 | $CH_2CH_2(-Si(CH_3)-O-)_n Si(CH_3)-CH_2CH_2$ with $-CH_2-CH_2-OH$ end groups; $Mn = 5600$ | same backbone with $-CH_2-CH_2-O-C(=O)-NH-C(=O)-C(H)=CH_2$ end groups | 250 |

What is claimed is:

1. A polymerizable silicon-containing monomer represented by the formula (I):

$$R^1{}_m(CH_2=\overset{R^3}{\underset{|}{C}}-A-\overset{H}{\underset{|}{N}}-B-R^2)_n SiO_{\frac{4-m-n}{2}} \quad (I)$$

wherein $R^1$ represents a substituted or unsubstituted monovalent hydrocarbon radical; $R^2$ represents a substituted or unsubstituted alkylene attached to a silicon atom; m and n each represents a positive number fulfilling the requirement of $2 \leq m+n \leq 4$; $R^3$ is a hydrogen atom or a methyl group; A is a direct bond, $$-\underset{O}{\overset{||}{C}}-O-R^4-, \quad -\underset{O}{\overset{||}{C}}-, \quad -\underset{O}{\overset{||}{C}}-NH-R^5-$$

or a substituted or unsubstituted phenylene: B is $$-\underset{O}{\overset{||}{C}}-O- \quad \text{or} \quad -\underset{O}{\overset{||}{C}}-\underset{|}{\overset{H}{N}}-;$$

$R^4$ and $R^5$ each represents an alkylene, providing that when A represents $$-\underset{O}{\overset{||}{C}}-O-R^4-,$$

m+n is 2.

2. A monomer according to claim 1, wherein $R^1$ is methyl or propyl; $R^2$ is propylene; A is

B is $$-\underset{O}{\overset{||}{C}}-O-;$$

$R^3$ is methyl; m is 7/4 and n is ¼.

3. A monomer according to claim 1, wherein $R^1$ is methyl; $R^2$ is propylene; A is

B is $$-\underset{O}{\overset{||}{C}}-O-;$$

$R^3$ is methyl; m is 7/3 and n is ⅓.

4. A monomer according to claim 1, wherein $R^1$ is methyl or propyl; $R^2$ is propylene; A is $$-\underset{O}{\overset{||}{C}}-O-C_2H_4-;$$

B is $$-\underset{O}{\overset{||}{C}}-O-;$$

$R^3$ is methyl; m is 7/4 and n is ¼.

5. A monomer according to claim 1, wherein $R^1$ is methyl or propyl; $R^2$ is $-C_2H_4OC_3H_6-$; A is

B is $$-\underset{\underset{O}{\|}}{C}-O-;$$

$R^3$ is methyl; m is 7/4 and n is 1/4.

6. A monomer according to claim 1, wherein $R^1$ is methyl or propyl; $R^2$ is propylene; A is $$-\underset{\underset{O}{\|}}{C}-;$$

B is $$-\underset{\underset{O}{\|}}{C}-O-;$$

$R^3$ is hydrogen; m is 7/4 and n is 1/4.

7. A monomer according to claim 1, wherein $R^1$ is methyl or propyl; $R^2$ is propylene; A is $$-\underset{\underset{O}{\|}}{C}-;$$

B is $$-\underset{\underset{O}{\|}}{C}-O-;$$

$R^3$ is methyl; m is 3/2 and n is 1/2.

8. A monomer according to claim 1, wherein $R^1$ is methyl; $R^2$ is methylene; A is $$-\underset{\underset{O}{\|}}{C}-;$$

B is $$-\underset{\underset{O}{\|}}{C}-O-;$$

$R^3$ is methyl; m is 3 and n is 1.

9. A monomer according to claim 1, wherein $R^1$ is methyl or phenyl; $R^2$ is methylene; A is $$-\underset{\underset{O}{\|}}{C}-;$$

B is $$-\underset{\underset{O}{\|}}{C}-O-;$$

$R^3$ is methyl; m is 3 and n is 1.

10. A monomer according to claim 1, wherein $R^1$ is methyl; $R^2$ is propylene; A is $$-\underset{\underset{O}{\|}}{C}-;$$

B is $$-\underset{\underset{O}{\|}}{C}-\underset{\underset{H}{|}}{N}-;$$

$R^3$ is methyl; m is 2 and n is 1.

11. A monomer according to claim 1, wherein $R^1$ is methyl; $R^2$ is propylene; A is $$-\underset{\underset{O}{\|}}{C}-;$$

B is $$-\underset{\underset{O}{\|}}{C}-\underset{\underset{H}{|}}{N}-;$$

$R^3$ is methyl; m is 2 and n is an integer of 1/53 to 2/13.

12. A monomer according to claim 1, wherein $R^1$ is methyl; $R^2$ is propylene; A is $$-\underset{\underset{O}{\|}}{C}-;$$

B is $$-\underset{\underset{O}{\|}}{C}-O-;$$

$R^3$ is methyl; m is 2 and n is a fraction of 1/53 to 2/13.

13. A process for preparing the polymerizable monomer of claim 1 which comprises the combination of steps of effecting the addition-reaction of an organosilicon compound containing hydroxyl groups of the formula (II):

$$R^1{}_m(ZR^2)_nSiO_{\frac{4-m-n}{2}} \quad (II)$$

wherein $R^1$ is a substituted or unsubstituted monovalent hydrocarbon radical; $R^2$ is a substituted or unsubstituted alkylene attached to a silicon atom; m and n each represents a positive number fulfilling the requirement of $2 \leq m+n \leq 4$, providing that when A of the undermentioned isocyanate compound represents $$-\underset{\underset{O}{\|}}{C}-O-R^4-,$$

m+n is 2, with an isocyanate compound of the formula (IV):

$$Y-CH_2-\underset{\underset{R^3}{|}}{C}H-A-NCO \quad (IV)$$

wherein Y represents a halogen atom; $R^3$ is hydrogen or methyl; A is a direct bond,

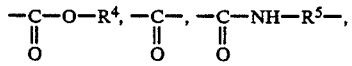

or a substituted or unsubstituted phenylene; and R⁴ and R⁵ each represents an alkylene, to obtain a compound of the formula (V):

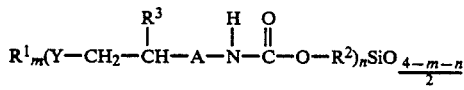

in which R¹, R², R³, m, n, Y and A are as defined above, and effecting dehydrohalogenation of the above mentioned compound (V) with a dehydrohalogenation agent.

14. A process for preparing the polymerizable monomer of claim 1 which comprises effecting an addition-reaction of an organosilicon compound of the formula (II):

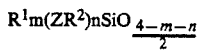

wherein Z is HO— or NH₂—, R¹ represents a substituted or unsubstituted monovalent hydrocarbon radical; R² is a substituted or unsubstituted alkylene attached to a silicon atom; m and n each is a positive number fulfilling the requirement of 2≦n+m≦4, providing that when A of the undermentioned isocyanate compound represents

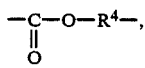

m+n is 2, with an isocyanate compound having an α,β-ethylenically unsaturated bond represented by the formula (III);

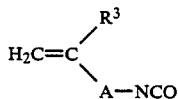

wherein R³ is hydrogen or methyl; A is a direct bond,

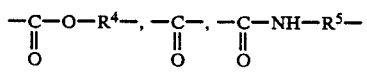

or a substituted or unsubstituted phenylene; and R⁴ and R⁵ each represents an alkylene.

15. A process according to claim 14, wherein the compound of the formula (II) is

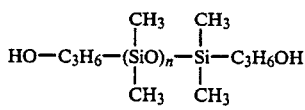

in which n is a number required for providing the compound with a number average molecular weight of 1000 to 8000, and the compound of the formula (III) is methacryloyl isocyanate.

16. A process according to claim 14, wherein the compound represented by the formula (III) is methacryloyl isocyanate and the compound represented by the formula (II) is 1,3,5,7-tetramethyl-3,5,7-tripropyl-1-(γ-hydroxy propyl) cyclotetra siloxane.

17. A process according to claim 14, wherein the compound represented by the formula (III) is 2-isocyanate ethyl methacrylate and the compound represented by the formula (II) is 1,3,5,7-tetramethyl-3,5,7-tripropyl-1-(γ-hydroxy propyl) cyclotetrasiloxane.

18. A process according to claim 14, wherein the compound represented by the formula (III) is methacryloyl isocyanate and the compound represented by the formula (II) is bis(trimethylsiloxy) methyl-3-hydroxypropyl silane.

19. A process according to claim 14, wherein the compound of the formula (II) is 1,3,5,7-tetramethyl-3,5,7-tripropyl-1-(γ-hydroxyethoxypropyl) cyclotetrasiloxane and the compound represented by the formula (III) is methacryloyl isocyanate.

20. A process according to claim 14, wherein the compound of the formula (II) is hydroxymethyl trimethyl silane and the compound represented by the formula (III) is methacryloyl isocyanate.

21. A process according to claim 14, wherein the compound of the formula (II) is

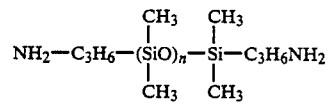

wherein n is a number for providing the compound with a number average molecular weight of 1000 to 8000, and the compound of the formula (III) is methacryloyl isocyanate.

22. A process according to claim 14, wherein the compound of the formula (II) is 1,3,5,7-tetramethyl-3,5,7-tripropyl-1-γ-hydroxypropyl-cyclotetrasiloxane and the compound of the formula (III) is acryloyl isocyanate.

23. A process according to claim 14, wherein the compound of the formula (II) is

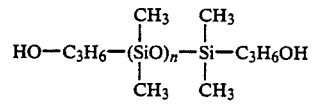

wherein n is a number required for providing the compound with a number average molecular weight to 1000 to 8000, and the compound of the formula (III) is acryloyl isocyanate.

24. A process according to claim 13, wherein the compound of the formula (II) is hydroxymethyl trimethyl silane and the compound of the formula (IV) is α-chloromethyl propionyl isocyanate.

25. A process according to claim 13, wherein the compound of the formula (II) is hydroxymethyl trimethyl silane and the compound of the formula (IV) is β-chloropropionyl isocyanate.

* * * * *